US 6,738,216 B2

(12) United States Patent
Kawana et al.

(10) Patent No.: US 6,738,216 B2
(45) Date of Patent: May 18, 2004

(54) APPARATUS AND METHOD FOR HEAD LOAD CONTROL IN DISK DRIVE

(75) Inventors: Naoaki Kawana, Ome (JP); Katsuhiko Kaida, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 10/131,089

(22) Filed: Apr. 25, 2002

(65) Prior Publication Data
US 2003/0043496 A1 Mar. 6, 2003

(30) Foreign Application Priority Data
Aug. 30, 2001 (JP) .................. 2001-261844

(51) Int. Cl.[7] ............................. G11B 21/02
(52) U.S. Cl. ....................................... 360/75
(58) Field of Search ................. 360/75, 31, 59, 360/60, 255, 325, 323, 317, 324.12

(56) References Cited

U.S. PATENT DOCUMENTS

| 5,189,570 | A | * | 2/1993 | Maeda et al. ............. 360/75 |
| 5,189,575 | A | * | 2/1993 | Onooka et al. ............ 360/255 |
| 5,226,024 | A | * | 7/1993 | Mukawa .................. 369/13.2 |
| 5,309,421 | A | * | 5/1994 | Fujisawa ................. 369/77.1 |
| 5,384,757 | A | * | 1/1995 | Ohmori et al. ............ 369/13.21 |
| 5,408,377 | A | * | 4/1995 | Gurney et al. ............ 360/325 |
| 5,452,271 | A | * | 9/1995 | Ohmori et al. ............ 369/13.21 |
| 5,508,857 | A | * | 4/1996 | Horita .................... 360/75 |
| 5,926,019 | A | * | 7/1999 | Okumura .................. 324/210 |
| 6,025,979 | A | * | 2/2000 | Yamane et al. ............ 360/324.1 |
| 6,081,400 | A | * | 6/2000 | Lu et al. ................. 360/75 |
| 6,108,157 | A | * | 8/2000 | Yoneda et al. ............ 360/75 |
| 6,178,142 | B1 | * | 1/2001 | Fujita .................... 369/13.15 |
| 6,255,814 | B1 | * | 7/2001 | Shimazawa et al. ........ 324/252 |
| 6,295,175 | B1 | * | 9/2001 | Tomita et al. ............. 360/31 |
| 6,331,924 | B1 | * | 12/2001 | Takada .................. 360/323 |
| 6,392,851 | B1 | * | 5/2002 | Ishiwata et al. ........... 360/317 |
| 6,496,338 | B2 | * | 12/2002 | Hasegawa et al. ......... 360/324.12 |
| 6,522,134 | B1 | * | 2/2003 | Gill ..................... 324/210 |
| 6,580,574 | B1 | * | 6/2003 | Codilian ................. 360/60 |
| 6,603,619 | B1 | * | 8/2003 | Kojima et al. ............. 360/59 |
| 6,603,620 | B1 | * | 8/2003 | Berding .................. 360/60 |
| 6,607,923 | B2 | * | 8/2003 | Carr et al. ................ 438/3 |

FOREIGN PATENT DOCUMENTS

| JP | 58-177562 | * | 10/1983 | ....... G11B/19/04 |
| JP | 59-033676 | * | 2/1984 | ....... G11B/21/12 |
| JP | 59-038968 | * | 3/1984 | ....... G11B/19/04 |
| JP | 62-137782 | * | 6/1987 | ....... G11B/21/12 |
| JP | 03-242866 | * | 10/1991 | ....... G11B/19/02 |
| JP | 06-325478 | * | 11/1994 | ....... G11B/19/04 |
| JP | 10-134492 | * | 5/1998 | ....... G11B/19/04 |
| JP | 10-199120 | * | 7/1998 | ....... G11B/19/04 |
| JP | 11-039839 | * | 2/1999 | ....... G11B/25/04 |
| JP | 2000-235701 | * | 8/2000 | ....... G11B/5/02 |
| JP | 2002-100141 | * | 4/2002 | ....... G11B/21/12 |

* cited by examiner

Primary Examiner—David Hudspeth
Assistant Examiner—Fred F. Tzeng
(74) Attorney, Agent, or Firm—Pillsbury Winthrop LLP

(57) ABSTRACT

A head IC amplifies an output of a read head including MR elements and an ADC converts the amplified output into a digital value. When a CPU performs a head load operation to load a composite head including the read head onto a data area of a disk medium from a ramp, the CPU receives the output of the read head amplified by the head IC as a detection result of an external magnetic field applied to an HDD. The CPU determines whether the head load operation is performed or inhibited based on the received, amplified output of the read head, that is, the detection result of the external magnetic field applied to the HDD.

10 Claims, 3 Drawing Sheets

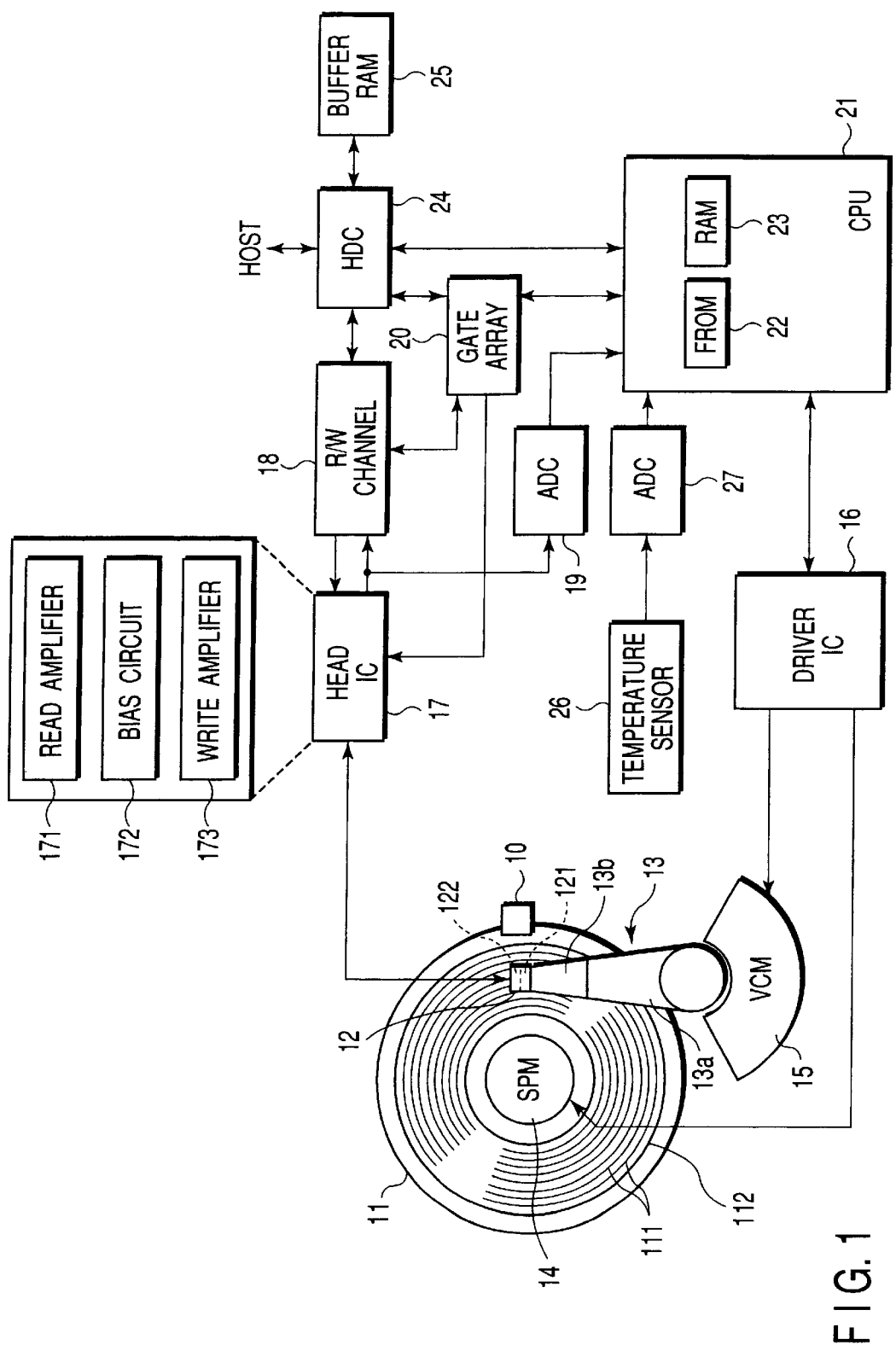
F I G. 1

APPARATUS AND METHOD FOR HEAD LOAD CONTROL IN DISK DRIVE

CROSS-REFERENCE TO RELATED APPLICATIONS

This application is based upon and claims the benefit of priority from the prior Japanese Patent Application No. 2001-261844, filed Aug. 30, 2001, the entire contents of which are incorporated herein by reference.

BACKGROUND OF THE INVENTION

1. Field of the Invention

The present invention relates to a disk drive apparatus having a head retracting mechanism and, more particularly, to an apparatus and a method for detecting a magnetic field that is externally applied to the apparatus and controlling the performance of a head load operation in accordance with the result of the detection.

2. Description of the Related Art

A hard disk drive is known as a disk drive using a disk medium as a storage medium. In a hard disk drive, a head (magnetic head) is used to read/write data from/to the disk medium. If a data read/write operation is performed in an environment where a magnetic field is externally applied to the hard disk drive, data on the disk medium is likely to be destroyed under the influence of the externally applied magnetic field. Electronic equipment such as a personal computer installed with a hard disk drive has recently been thinned and downsized. Accordingly, the hard disk drive has become susceptible to an external magnetic field.

Jpn. Pat. Appln. KOKAI Publication No. 3-242866 discloses an electronic device with a hard disk drive, such as an electronic computer, which includes a magnetic field detector for detecting a magnetic field that is applied to the hard disk drive. The Publication refers to the possibility that data will be altered when it is read/written from/to the hard disk drive to which a magnetic field is applied. If the data is altered, programs are likely to run away. According to the technique described in the Publication (referred to as prior art hereinafter), a data read/write operation is performed for the hard disk drive only when no magnetic field is applied to the hard disk drive. When a magnetic field is applied to the hard disk drive, the performance of the data read/write operation is held by a host itself. The host therefore inquires of the magnetic field detector whether a magnetic field is applied to the hard disk drive immediately before the host performs a data read/write operation for the hard disk drive.

However, the prior art pays no attention to the problem caused when the head is located above a data area secured on a disk medium of the hard disk drive and a magnetic field is applied to the hard disk drive. In other words, the problem is that when an inductive head is used, a current flows through the head by induced noise due to the external magnetic field. If a current excited by an external magnetic field flows through the head when the head is located above a data area (data track) of the disk medium, data of the data area (data track) may be destroyed even though the host holds the data read/write operation.

In general, when a disk medium reaches a constant rotation speed at the time of startup of a hard disk drive, a head is automatically loaded above a data area of the disk medium from a head retracting mechanism such as a ramp, irrespective of the operation of a host. In this state, the host can read/write data from/to the disk medium. If, however, an external magnetic field is applied to the head when the head is loaded, it is feared that data recorded on the disk medium may be destroyed due to the current flowing through the head under the influence of the external magnetic field before the host performs the data read/write operation for the disk medium. As in the prior art described above, to check whether an external magnetic field is applied to the hard disk drive immediately before a data read/write operation is not necessarily effective in terms of preventing the destruction of data recorded on the disk medium.

BRIEF SUMMARY OF THE INVENTION

The present invention has been made in consideration of the above situation and an object thereof is to detect a magnetic field externally applied when a head is loaded above a data area of a disk medium from a head retracting mechanism and prevent data recorded on the disk medium from being destroyed by inhibiting the head from being loaded in accordance with the result of the detection even though a current flows through the head due to the external magnetic field.

According to an aspect of the invention, there is provided a disk drive comprising a head retracting mechanism into which a head is retracted from a data area of a disk medium. The disk drive comprises an actuator, a magnetic field detector, head load means, and control means. The actuator supports the head and drives the head in a radial direction of the disk medium. The magnetic field detector detects an externally applied magnetic field. The head load means drives the actuator and performs a head load operation to move the head from the head retracting mechanism to the data area of the disk medium. The control means checks a result of detection obtained from the magnetic field detector while the head is retracted into the head retracting mechanism and inhibits the head load means from performing the head load operation in accordance with the result of detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of a hard disk drive according to a first embodiment of the present invention.

DETAILED DESCRIPTION OF THE INVENTION

Figure 2:
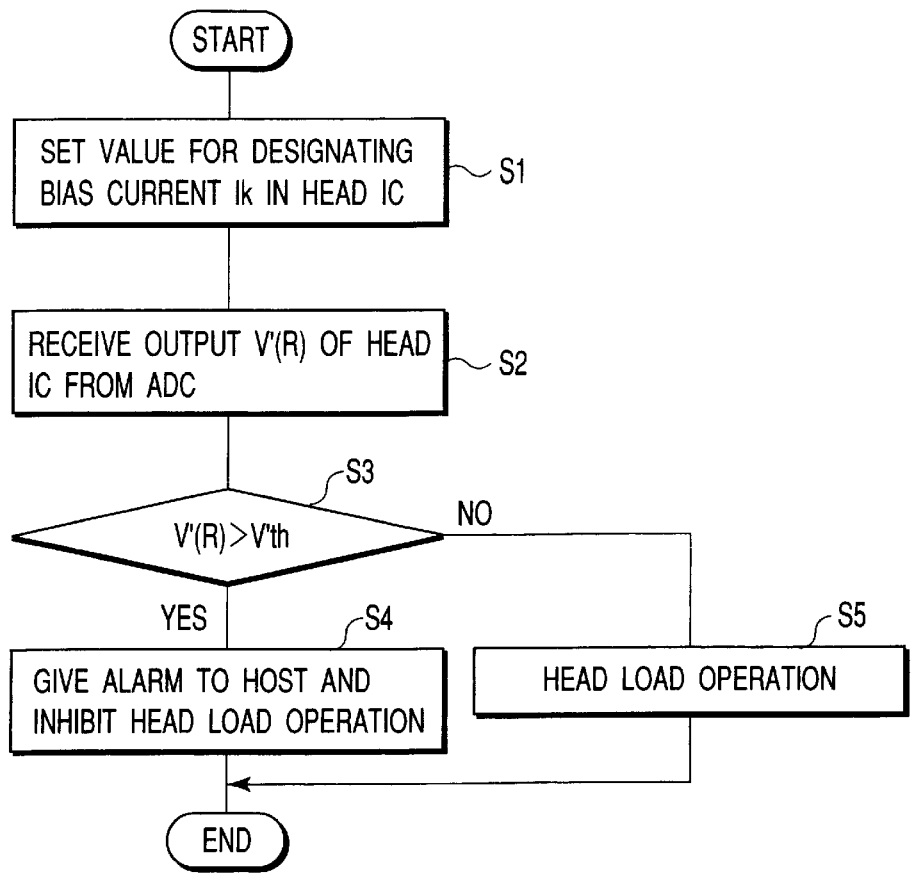
FIG. 2 is a flowchart explaining an operation of the hard disk drive according to the first embodiment, which is performed when a head is loaded.

A hard disk drive according to the embodiments of the present invention will now be described with reference to the accompanying drawings.

[First Embodiment]

FIG. 1 is a block diagram showing a configuration of a hard disk drive according to a first embodiment of the present invention. In the hard disk drive (referred to as HDD hereinafter) shown in FIG. 1, a disk medium (magnetic disk medium) 11 has upper and lower two disk surfaces. One or both of the disk surfaces of the disk medium 11 serve as recording surfaces on which data is magnetically recorded. A ring-shaped data area 112 is secured on each of the recording surfaces of the disk medium 11. The data area 112 includes a number of concentric tracks (data tracks) 111. A head (magnetic head) 12 is provided for each of the recording faces of the disk medium 11. The head 12 is used to write data to the disk medium 11 (data recording) and read data from the disk medium 11 (data reproduction). The head 12 is a composite one including a read head 121 and a write head 122 that are integrated on a single slider. The read head 121 is an MR (magnetoresistive) head composed of MR elements. The write head 122 is an inductive head composed of induction type recording thin-film elements. In the configuration of the HDD shown in FIG. 1, it is assumed that the HDD includes a single disk medium 11; however, the HDD may have a plurality of disk mediums 11 that are stacked one on another.

A plurality of servo areas (not shown) are arranged radially in the disk medium 11 and discretely at regular intervals in the direction of the circumference of the disk medium 11. Servo data for use in head positioning control, etc. is recorded on each of the serve areas. The servo data includes a track code (cylinder number) and a burst signal. The track code indicates a track (cylinder) where a corresponding servo area is located. The burst signal represents relative positional information (positional error) of the head in a track where a corresponding servo area is located by the amplitude of reproduced waves. The track code and burst signal are used as positional information for positioning the head 12 within a target range of a target track.

The head 12 is attached to the top end of a rotary actuator 13 and supported by the actuator 13. More specifically, the head 12 is attached to the top end of a suspension 13b extending from an arm 13a of the actuator 13. The head 12 moves in the radial direction of the disk medium 11 as the actuator 13 rotates. The head 12 is therefore positioned above a target track. A ramp (ramp mechanism) 10 is arranged close to the outer circumference of the disk medium 11. The ramp 10 is a head retracting mechanism for retracting the head 12 while the disk medium 11 stops rotating, etc. The ramp 10 is provided close to the disk medium 11 and located in a given position on a movement path of the top end of the actuator 13.

The disk medium 11 is rotated at high speed by a spindle motor (referred to as SPM hereinafter) 14. The actuator 13 includes a voice coil motor (referred to as VCM hereinafter) 15 serving as a driving source of the actuator 13 and is driven by the VCM 15.

The SPM 14 and VCM 15 are driven by a driving current supplied from a driver IC (integrated circuit) 16. The driver IC 16 is a one-chip motor driver that includes an SPM driver and a VCM driver. A value (controlled variable) for determining the above driving current is determined by a CPU 21.

The head 12 is connected to a head IC 17 mounted on a flexible printed circuit board (FPC). The head IC 17 is a one-chip head amplifying circuit including a read amplifier 171, a bias circuit 172, and a write amplifier 173. The read amplifier 171 amplifies a read signal read by a read head 121 in the head 12. The bias circuit 172 supplies a bias current to the read head 121. The write amplifier 173 converts write data into a write current to be supplied to a write head 122 in the head 12. The head IC 17 is connected to a read/write channel (referred to as R/W channel hereinafter) 18 and an A/D (analog/digital) converter (referred to as ADC hereinafter) 19.

The R/W channel 18 processes various signals. This signal processing includes A/D conversion processing for converting an amplified read signal output from the head IC 17, encoding processing for encoding write data, and decoding processing for decoding read data. The R/W channel 18 has a function of pulsing a read signal and outputting it as pulsed read data. The R/W channel 18 has another function of extracting a burst signal from servo data in response to a timing signal (burst timing signal) issued from a gate array 20. The burst signal is transmitted to the CPU 21 and used for positioning control for positioning the head 12 in a target track, that is, track following control. The ADC 19 converts the read signal amplified by and output from the head IC 17 into a digital value. The output of the ADC 19 is sent to the CPU 21 and used to detect a magnetic field externally applied to the HDD. The ADC 19 can be built into the gate array 20.

The gate array 20 is an ASIC (Application Specific Integrated Circuit). The gate array 20 has a function of generating various timing signals containing a burst-timing signal from a read pulse output from the R/W channel 18. The gate array 20 has another function of extracting a track code included in servo data. The track code is sent to the CPU 21 and used for seek control for moving the head 12 to a target track. The gate array 20 has still another function of setting a value of bias current, which is supplied to the read head 121 from (the bias circuit 172 in) the head IC 17, in the head IC 17 in accordance with the designation of the CPU 21.

The CPU 21 contains a nonvolatile memory which stores control programs to be executed by the CPU 21, such as a FROM (Flash Read Only Memory) 22. The CPU 21 also contains a RAM (Random Access Memory) 23 that provides a work area of the CPU 21 and the like. The CPU 21 controls the entire HDD in accordance with the control programs stored in the FROM 22. In other words, the CPU 21 positions the head 12 in a target track in response to both the track code extracted by the gate array 20 and the burst signal issued by the R/W channel 18. The CPU 21 also controls a read/write operation, which is performed by a disk controller 24, in response to a read/write command issued from the host. Further, the CPU 21 detects a magnetic field externally applied to the HDD based on the output value of the ADC 19 when the head 12 retracted in the ramp 10 is loaded above the data area 111 of the disk medium 11. The output value of the ADC 19 corresponds to a digital converted value of the read signal amplified by the head IC 17. The CPU 21 controls the execution of head load based on the detection result of the magnetic field.

The disk controller (referred to as HDC hereinafter) 24 is connected to the host (host system) using the HDD. The host is electronic equipment such as a personal computer. The HDC 24 processes the read data encoded by the R/W channel 18 in response to a control signal from the gate array 20 to thereby generate data to be transferred to the host. The HDC 24 also encodes the write data, which is transferred from the host, in response to the control signal and transfers the encoded data to the R/W channel 18.

A buffer RAM 25 is connected to the HDC 24. A buffer area is secured in the buffer RAM 25. The buffer area is used to temporarily store data (write data) that is to be transferred from the host and written to the disk medium 11 and data (read data) that is to be read out of the disk medium 11 and transferred to the host.

The overview of the operation of the HDD shown in FIG. 1 will now be described. Assume that the HDD has not yet started up. In this state, the head 12 is located in a parking position of the ramp 10. When the HDD starts up, the driver IC 16 supplies a driving current (SPM current) to the SPM 14, and the SPM 14 starts to rotate. As the SPM 14 rotates, the disk medium 11 rotates. When the SPM 14 reaches a constant rotation speed, the driver IC 16 supplies the VCM 15 with a driving current (VCM current) for moving the head 12 above the disk medium 11 under the control of the CPU 21. Thus, the VCM 15 turns the actuator 13 to the disk medium 11 from the ramp 10. Then, the head 12 attached to the top end of the actuator 13 is moved (loaded) above the data area 112 from the ramp 10. This is a head load operation in the HDD. If the host supplies the HDD shown in FIG. 1 with a command for requesting read of data from the disk medium 11 or write of data thereto after the head load operation, read or write of the requested data is performed through the head IC 17 under the control of the CPU 21.

If a magnetic field is externally applied to the HDD when the head 12 is loaded above the data area 112 of the disk medium 11, there is a possibility that the following phenomenon will occur irrespective of read/write of data. The magnetic field externally applied to the HDD causes a current to flow through the write head (inductive head) 122 of the head (composite head) 12. The current flowing through the write head 122 depends upon the intensity of the externally applied magnetic field. Of the data recorded on the data area 112 of the disk medium 11, it is feared that data in a position of the write head 122 may be destroyed depending on the amount of the current. Recently in particular, the casing of a host mounted with an HDD has been thinned and downsized; therefore, the HDD has become susceptible to the external magnetic field.

The CPU 21 thus detects a magnetic field externally applied to the HDD when it performs control to load the head 12 above the data area 112 of the disk medium 11 from the ramp 10. If it is feared that data on the data area 112 will be destroyed by the detected external magnetic field, the CPU 21 does not load the head 12 but gives an alarm to the host.

An operation of the HDD shown in FIG. 1, which is performed when the head is loaded, will now be described with reference to the flowchart shown in FIG. 2. The read head 121 applied to the first embodiment of the present invention is an MR head composed of MR elements. As is known, the resistance value of the MR head varies with a magnetic field. The MR head is used to detect the variation in resistance value as a variation in voltage and read the data magnetically recorded on the disk medium. In other words, the MR head is a sort of magnetometric sensor having a magnetic field (magnetism) detecting function. According to the first embodiment, a magnetic field externally applied to the HDD is detected using the magnetic field detecting function of the read head 121 before the head is loaded.

When the CPU 21 performs a head load operation, it sets a parameter for designating a bias current Ik having a preset value in a bias current register (not shown) in the head IC 17 through the gate array 20 (step S1). Thus, the bias circuit 172 in the head IC 17 supplies the read head 121 with the bias current IK designated by the parameter set in the bias current register, that is, a predetermined, fixed bias current Ik. Thus, the read head 121 generates a voltage $V(R)=Ik*R$, which depends upon the bias current Ik supplied to the read head 121 and resistance value R of the read head 121. Assume that the resistance value of the read head 121 to which no magnetic field is applied is Rc. In this case, an amount of variation ($\Delta R=R-Rc$) in the resistance value of the read head 121 depends upon the intensity of the magnetic field applied to the read head 121. When no magnetic field is applied to the read head 121, The level Vc of a voltage signal generated from the read head 121 becomes $Ik*Rc$. An amount of variation $\Delta V$ in the level of the voltage signal generated from the read head 121, which is based when no magnetic field is applied to the read head 121, is given by $V(R)-Vc$. As described above, since $V(R)=Ik*R$ and $Vc=Ik*Rc$, $\Delta V$ can be expressed as follows: $\Delta V=V(R)-Vc=Ik*R-Ik*Rc=Ik*(R-Rc)$. Therefore, $\Delta V$ also depends upon the intensity of the magnetic field applied to the read head 121. In other words, the voltage signal generated from the read head 121 can be considered to be a magnetic field detecting signal.

The voltage signal V(R) generated from the read head 121 is amplified at a constant amplification factor $\alpha$ by (the read amplifier 18 in) the head IC 17. Assuming that the level of the amplified voltage signal is V'(R), V'(R) is given by the following equation: $V'(R)=\alpha*V(R)=\alpha*Ik*R$. The ADC 19 converts the level V'(R) ($=\alpha*Ik*R$) of the amplified voltage signal into a digital value. The CPU 21 receives the digital value from the ADC 19 (step S2). The voltage signal level V'(R) ($=\alpha*Ik*R$) corresponds to a relative value of the resistance of the read head 121 since $\alpha$ and Ik are each constant.

Assume that the level of a voltage signal that the CPU 21 is to receive from the ADC 19 when no magnetic field is applied to the read head 121 is V'c. This voltage signal level V'c is given by the following equation: $V'c=\alpha*Vc=\alpha*Ik*Rc$. A difference between V'(R) and V'c or the amount of variation in voltage signal level $\Delta V'=V'(R)-V'c$ can be expressed as follows: $\alpha*(V(R)-Vc)=\alpha*\Delta V=\alpha*Ik*(R-Rc)$. Please note that (the head 12 including) the read head 121 is located above the ramp 10. In this state, the read head 121 is not influenced by the magnetic field from the disk medium (magnetic disk medium) 11. Consequently, the above amount of variation, $\Delta V'=V'(R)-V'c=\alpha*Ik*(R-Rc)$, depends upon the intensity of the magnetic field applied to the HDD from outside the HDD, that is, the intensity of the external magnetic field.

Assume that the smallest amount of variation $\Delta Rth$ in resistance value of the read head 121, which corresponds to the external magnetic field that is likely to destroy data on the data area 112 of the disk medium 11, is $Rth-Rc$. Also assume that the voltage signal level V'(R) is V'th and the amount of variation $\Delta V'$ in the voltage signal level is $\Delta V'th$. In this case, V'th and $\Delta V'th$ are given by the following equations, respectively: $V'th=\alpha*Ik*Rth$ and $\Delta V'th=V'th-V'c$. Using $\Delta V'th$ as a threshold value, the CPU 21 checks whether the amount of variation $V'(R)-V'c$ exceeds $\Delta V'th$. If the head 12 is located above the data area 112 of the disk medium 11, the CPU 21 can determine whether data corresponding to the location of the head 12 is likely to be destroyed. This determination is referred to as a first determination method. V'th is equal to $\Delta V'th+V'c$ and V'c is constant. Even by checking whether the voltage signal level $V'(R)=\alpha*Ik*R$ exceeds $V'th=\alpha*Ik*Rth$, the CPU 21 can determine whether data corresponding to the location of the head 12 is likely to be destroyed when the head is located above the data area 112 of the disk medium 11. This is referred to as a second determination method.

In the first embodiment of the present invention, the second determination method is used for simplification of processing. More specifically, the CPU 21 compares the voltage signal level $V'(R)=\alpha*Ik*R$ received from the ADC 19 with the above threshold value V'th=α*Ik*Rth (step S3). If V'(R)>V'th or the resistance value R=V'(R)/(α*Ik) of the read head 121 exceeds the resistance value Rth−V'th/(α*Ik), the CPU 21 determines that an external magnetic filed that is likely to destroy data on the data area 112 is applied to the HDD. In this case, the CPU 21 gives to the host an alarm that the external magnetic field is applied to the HDD and inhibits the head from being loaded (step S4). In the first embodiment, when the CPU 21 detects at startup of the HDD that an external magnetic field that is likely to destroy data on the data area 112 is applied to the HDD before the head is loaded, it inhibits the head load operation. Thus, even though a current is caused to flow through the head 12 under the influence of the external magnetic field, data on the data area 112 can be prevented from being destroyed.

On the other hand, if V'(R)≦V'th or the resistance value R(=V'(R)/(α*Ik)) of the read head 121 does not exceed the resistance value Rth (=V'th/(α*Ik)), the CPU 21 determines that an external magnetic filed that is likely to destroy data on the data area 112 is not applied to the HDD. In this case, the CPU 21 controls the driver IC 16 and performs a head load operation to load the head 12 above the data area 112 of the disk medium 11 from the ramp 10 (step S5).

The first determination method can be used instead of the second determination method. To do so, the voltage signal level V'c can be stored in advance in the FROM 22 and a difference ΔV'th between V'c and V'th (ΔV'th=V'c−V'th) can be used as a threshold value. A difference V'(R)−V'c between the voltage signal level V'(R) sent into the CPU 121 from the ADC 19 and the voltage signal level V'c or the amount of variation ΔV'(=V'(R)−V'c) in voltage signal level can be obtained. It has only to be checked whether the amount of variation ΔV' exceeds the difference ΔV'th or not. In this method, an external magnetic field can be detected by performing the following operation ΔV'=V'(R)−V'c=α*Ik* (R−Rc) or obtaining a difference between V'(R) and V'c. The detected external magnetic filed reflects variations in resistance of the read head 121. Thus, the precision of detection of the external magnetic field is improved.

The resistance values of read heads 121 of respective HDDs are different from one another and so are the voltage signal levels V'c of the read heads 121. If a voltage signal level V'c, which is measured for each read head 121 and stored in the FROM 22 at the time of manufacture of each HDD, can be used for the head load operation, the precision of detection of the external magnetic field can be improved further.

The resistance value of each read head 121 has temperature dependence. Therefore, an HDD generally has a temperature sensor 26 for sensing temperature of the HDD as illustrated in FIG. 1. In this HDD, a bias current corresponding to the HDD temperature sensed by the temperature sensor 26 is supplied to the read head 121 such that the read head 121 can read the optimum data without being influenced by temperature environment of the HDD. If, therefore, the HDD temperature is written to the CPU 21 through an ADC 27 to correct the voltage signal level V'c, the detection precision of the external magnetic field can be improved further. If a multiplexer is provided which selects one of outputs of the head IC 17 and the temperature sensor 26 as an input of the ADC 27 under the control of the CPU 21, the ADC 19 is not required.

In the HDD having the ramp 10 as shown in FIG. 1, the head 12 is generally retracted into the ramp 10 when the host issues no request for a fixed period of time even though the disk medium 11 rotates. The state in which the head 12 is retracted in a parking position of the ramp 10 while the disk medium 11 is rotating is generally called an idling state of the HDD. If the host issues a request to read/write data in the idling state, the CPU 21 loads the head 12 above the data area 112 again. Thus, the CPU 21 can detect an external magnetic field and inhibit a head load operation in accordance with the result of the detection before the head 12 is loaded above the data area 112 again at the time of startup of the HDD as described above. Even though a current flows through the head 12 under the influence of the external magnetic field when the head is loaded again, the risk that data recorded on the data area 112 will be destroyed can be prevented.

(Second Embodiment)

Figure 3:
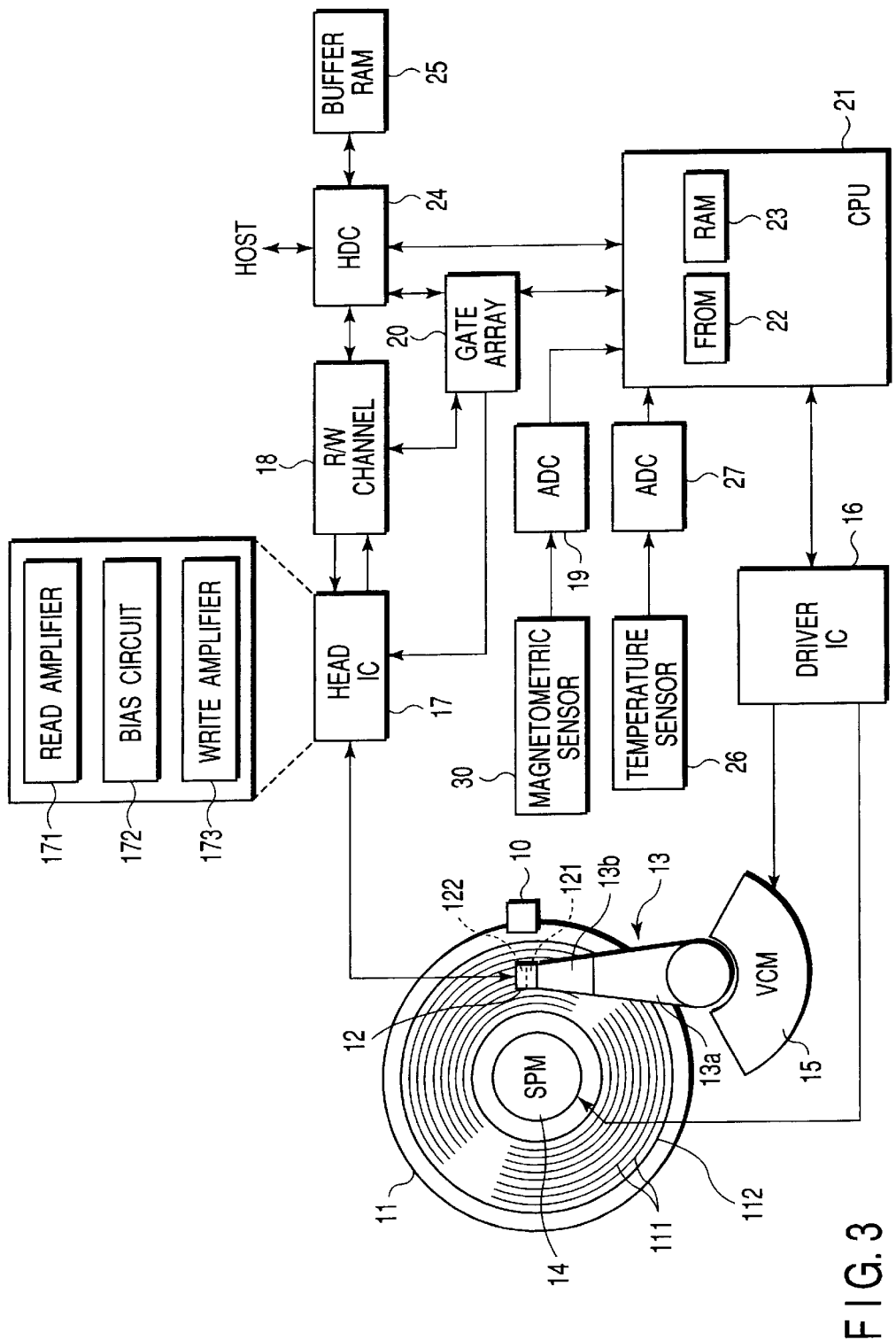
FIG. 3 is a block diagram showing a configuration of a hard disk drive according to a second embodiment of the present invention.

FIG. 3 is a block diagram showing a configuration of a hard disk drive (HDD) according to a second embodiment of the present invention. In FIG. 3, the same components as those of FIG. 1 are denoted by the same reference numerals. The feature of the HDD shown in FIG. 3 lies in that a read head 121 is not used as a magnetic sensor (magnetic field detector) for detecting a magnetic field to be applied to the HDD but a special-purpose magnetic sensor 30 for doing so is provided. The magnetic sensor 30 detects a magnetic field applied to the HDD and converts it into, e.g., a voltage. An ADC 19 converts a detection output of the magnetic sensor 30 into a digital value. A CPU 21 receives the digital value from the ADC 19 when it performs a head load operation. Then, the CPU 21 compares the digital value with a predetermined threshold value as in the step S3 of the first embodiment. If the CPU 21 loads the head 12 above the data area 112 of the disk medium 11, it determines based on the result of the comparison whether data on the data area 112 corresponding to the location of the head 12 is likely to be destroyed under the influence of the external magnetic field. If it is feared that data may be destroyed, the CPU 21 inhibits a head load operation as in the step S4 of the first embodiment.

Figure 4:
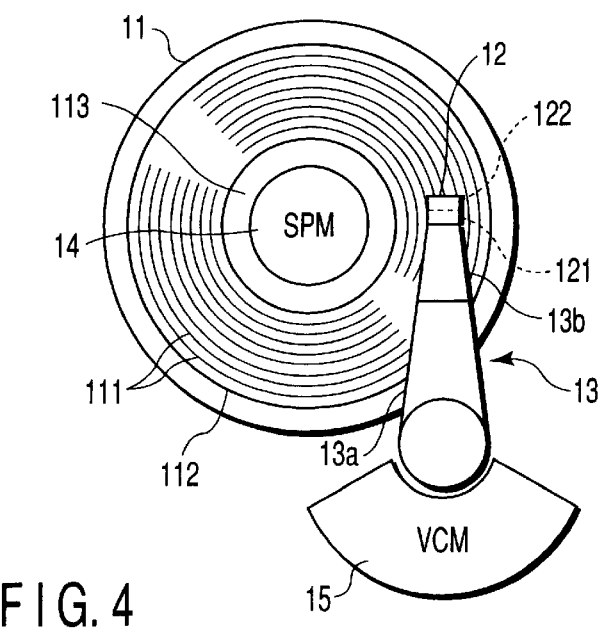
FIG. 4 is a view showing an example of a disk medium including a CSS area as a head retracting mechanism.

In the foregoing first and second embodiments, the present invention is applied to the HDD using the ramp 10 as a head retracting mechanism. However, as shown in FIG. 4, the present invention can be applied to an HDD using a ring-shaped non-data area secured on the innermost radius of the disk medium 11 as a CSS (Contact Start Stop) area 113. The CSS area 113 is a head retracting mechanism corresponding to the ramp 10. In the above embodiments, the present invention is applied to the HDD (Hard Disk Drive). However, the present invention can be applied to a disk drive other than the HDD, such as a magneto-optical disk drive, if it includes a head retracting mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive apparatus comprising:
 a disk medium including a data area on which data is recorded;
 an actuator which supports a head used to read/write data from/to the data area of the disk medium and drives the head in a radial direction of the disk medium, wherein the head is a composite head including a magnetoresistive head used as a read head and an inductive head used as a write head, and the magnetoresistive head serves as both the read head and a magnetic field detector which detects an externally applied magnetic field;

a head retracting mechanism into which the head is retracted from the data area of the disk medium;

head load means for performing a head load operation to drive the actuator and move the head from the head retracting mechanism to the data area of the disk medium;

control means for checking a result of detection obtained from the magnetic field detector while the head is retracted into the head retracting mechanism and inhibiting the head load means from performing the head load operation in accordance with the result of detection;

a head amplifying circuit which supplies a bias current to the magnetoresistive head and amplifies an output of the magnetoresistive head, the output corresponding to a resistance value of the magnetoresistive head which varies with a magnetic field applied to the magnetoresistive head; and an A/D converter which converts the output of the magnetoresistive head amplified by the head amplifying circuit into a digital value, wherein when the head load means performs the head load operation, the control means supplies a preset bias current to the magnetoresistive head from the head amplifying circuit, receives the output of the magnetoresistive head, which is amplified by the head amplifying circuit, through the A/D converter, and processes the output as the result of detection.

2. The disk drive apparatus according to claim 1, wherein the control means compares an output level V'(R) of the A/D converter with a preset threshold value V'th and inhibits the head load means from performing the head load operation when the output level V'(R) exceeds the preset threshold value V'th.

3. The disk drive apparatus according to claim 2, wherein an output level of the A/D converter is used as the threshold value V'th, the output level being obtained when a lowest-level magnetic field that is likely to destroy data on the data area of the disk medium is externally applied to the disk drive apparatus.

4. The disk drive apparatus according to claim 1, wherein the control means compares a difference ΔV'=(V'(R)−V'c) between an output level V'(R) of the A/D converter and an output level V'c of the A/D converter obtained when no magnetic field is externally applied to the disk drive apparatus with a threshold value ΔV'th that is expressed by a difference V'th−V'c between the output level V'c and the output level V'th of the A/D converter obtained when a lowest-level magnetic field that is likely to destroy data on the data area of the disk medium is externally applied to the disk drive apparatus, and inhibits the load head means from performing the head load operation when ΔV' exceeds ΔV'th.

5. The disk drive apparatus according to claim 4, wherein the output level V'c of the A/D converter of the disk drive apparatus to which no magnetic field is externally applied is measured in a stage of manufacturing the disk drive apparatus and used as a voltage signal level unique to the magnetoresistive head.

6. The disk drive apparatus according to claim 5, further comprising:

a storage unit to store the output level V'c in advance; and a temperature sensor which measures temperature of the disk drive apparatus, and wherein the control means corrects the output level V'c stored in the storage unit in accordance with the temperature of the disk drive apparatus measured by the temperature sensor.

7. The disk drive apparatus according to claim 1, wherein the retracting mechanism is a ramp mechanism arranged close to an outer region of the disk medium.

8. The disk drive apparatus according to claim 1, wherein the retracting mechanism is a non-data area secured separately from the data area on the disk medium.

9. A disk drive apparatus comprising:

a disk medium including a data area on which data is recorded;

an actuator which supports a head used to read/write data from/to the data area of the disk medium and drives the head in a radial direction of the disk medium, wherein the head is a composite head including a magnetoresistive head used as a read head and an inductive head used as a write head, and the magnetoresistive head serves as both the read head and a magnetic field detector which detects an externally applied magnetic field;

a head retracting mechanism into which the head is retracted from the data area of the disk medium;

a CPU which performs a head load operation to drive the actuator and move the head from the head retracting mechanism to the data area of the disk medium, the CPU checking a result of detection obtained from the magnetic field detector while the head is retracted into the head retracting mechanism and inhibiting the head load operation from being performed in accordance with the result of detection;

a head amplifying circuit which supplies a bias current to the magnetoresistive head and amplifies an output of the magnetoresistive head, the output corresponding to a resistance value of the magnetoresistive head which varies with a magnetic field applied to the magnetoresistive head; and an A/D converter which converts the output of the magnetoresistive head amplified by the head amplifying circuit into a digital value, wherein when the CPU performs the head load operation, the CPU supplies a preset bias current from the head amplifying circuit to the magnetoresistive head, receives the output of the magnetoresistive head, which is amplified by the head amplifying circuit, through the A/D converter, and processes the output as the result of detection.

10. A method of controlling a head load operation in a disk drive to move a head from a head retracting mechanism to a data area on a disk medium, wherein the head is a composite head including a magnetoresistive head used as a read head and an inductive head used as a write head, and the magnetoresistive head is used as a magnetic field detector, the method comprising:

detecting a magnetic field externally applied to the disk drive by the magnetic field detector when the head load operation is performed;

receiving a result of detection obtained from the magnetic field detector;

determining whether data recorded on the data area of the disk medium is likely to be destroyed by performing the head load operation in accordance with the result of detection obtained by the magnetic field detector;

determining whether the head load operation is performed or inhibited in accordance with the result of detection;

supplying a preset bias current to the magnetoresistive head from a head amplifying circuit which amplifies an output of the magnetoresistive head when the head load operation is performed, wherein the output of the magnetoresistive head, which is amplified by the head amplifying circuit, is received through the A/D converter and processed as the result of detection.

* * * * *